US012802342B2

(12) United States Patent
Driscoll

(10) Patent No.: US 12,802,342 B2
(45) Date of Patent: Nov. 17, 2026

(54) LOW POWER REPROJECTION OF MIXED WORLD AND HEAD-LOCKED CONTENT

(71) Applicant: Apple Inc., Cupertino, CA (US)

(72) Inventor: Rory J. Driscoll, Hermosa Beach, CA (US)

(73) Assignee: Apple Inc., Cupertino, CA (US)

( * ) Notice: Subject to any disclaimer, the term of this patent is extended or adjusted under 35 U.S.C. 154(b) by 135 days.

(21) Appl. No.: 19/008,148

(22) Filed: Jan. 2, 2025

(65) Prior Publication Data

US 2025/0225716 A1 Jul. 10, 2025

Related U.S. Application Data

(60) Provisional application No. 63/617,584, filed on Jan. 4, 2024.

(51) Int. Cl.
*G06T 15/20* (2011.01)
*G06T 19/00* (2011.01)

(52) U.S. Cl.
CPC ............ *G06T 15/20* (2013.01); *G06T 19/006* (2013.01)

(58) Field of Classification Search
None
See application file for complete search history.

(56) References Cited

U.S. PATENT DOCUMENTS 8,063,900 B1 * 11/2011 O'Donnell .............. G06T 15/40 345/421
10,514,753 B2 12/2019 Haraden et al.
2015/0317831 A1 * 11/2015 Ebstyne .................. G06F 3/011 345/419
2022/0414966 A1 * 12/2022 Jeong ...................... G06T 15/00

FOREIGN PATENT DOCUMENTS

EP 3 602 248 B1 2/2020

* cited by examiner

*Primary Examiner* — Robert J Craddock
(74) *Attorney, Agent, or Firm* — Thompson Hine LLP

(57) ABSTRACT

Various implementations disclosed herein include devices, systems, and methods that provide an updated content view of an environment based on device movement. For example, a process may identify fragments associated with a view with pixels of the view based on portions of content. The fragments have pixel correspondences associating each of the fragments with a pixel of the view and the fragments have depths associated with a viewpoint. The fragments include a world-locked (WL) fragment type and a head-locked (HL) fragment type. The process may further include identifying a first group of fragments and a second group of fragments for each pixel based on the depths and fragment types. The process may further include updating pixel correspondences of fragments of the second group based on identifying the groups of fragments. Generating an updated view based on the first group of the fragments and the second group of the fragments.

20 Claims, 6 Drawing Sheets

LOW POWER REPROJECTION OF MIXED WORLD AND HEAD-LOCKED CONTENT

CROSS-REFERENCE TO RELATED APPLICATIONS

This Application claims the benefit of U.S. Provisional Application Ser. No. 63/617,584 filed Jan. 4, 2024, which is incorporated herein in its entirety.

TECHNICAL FIELD

The present disclosure generally relates to systems, methods, and devices that provide an updated content view of an extended reality (XR) environment based on device movement, for example, by updating pixel correspondences of fragments associated with an original content view.

BACKGROUND

Existing content reprojection techniques, may be improved with respect to minimizing artifacts, power efficiency, and other attributes.

SUMMARY

Various implementations disclosed herein include devices, systems, and methods that update a portion of content within an original view (e.g., a 2-dimensional grid of pixel values) of an environment such as, inter alia, an extended reality (XR) environment that includes virtual content and/or real content retrieved from, inter alia, pass-through video content. Updating the portion of content may provide an updated view of the environment based on movement of a device (e.g., a head mounted display (HMD)) that causes world-locked (WL) content position changes without causing head-locked (HL) content position changes. WL content may include content associated with a virtual world or a scene and is typically rendered in a background of a view. HL content may include content associated with a viewer perspective and/or a head position of a viewer and is typically rendered in a foreground of a view.

In some implementations, a portion of content (e.g., WL content) may be updated without updating other portions of the content (e.g., HL content) by utilizing a limited number of update layers such as, for example, two layers. Updating a portion of content may include dividing fragments (i.e., elements contributing to an appearance of a pixel) comprising content corresponding to pixel locations of a current 2D view based on a depth with respect to a viewpoint and a content type such as, inter alia, HL content, WL content, etc.

In some implementations, fragments of an original view are divided into two layers in response to identifying a frontmost WL fragment that is located at a position that is closest to a viewpoint. For example, all HL fragments that are located in positions that are in front of the frontmost WL fragment may be placed within a first layer that includes only HL fragments. Likewise, all other fragments in the original view may be placed within a second layer that may include WL fragments and HL fragments.

In some implementations, the second layer may be updated and reprojected such that positions of the fragments from original pixel positions in the original view are shifted over to new pixel positions for the updated view. Subsequently, the first and second layers are alpha blended (e.g., combining fragments or layers with varying levels of transparency or opacity) to provide the updated view. In some implementations, disocclusion occurring between HL fragments and WL fragments may be detected and resolved utilizing at least one HL fragment.

In some implementations, a device has a processor (e.g., one or more processors) that executes instructions stored in a non-transitory computer-readable medium to perform a method. The method performs one or more steps or processes. In some implementations, the device identifies fragments associated with an original view with corresponding pixels of the original view based on portions of content. The fragments each have pixel correspondences associating each of the fragments with a pixel of the original view. Likewise, the fragments have depths identifying distances of the portions of content from a viewpoint. One or more of the fragments has world-locked (WL) fragment type and one or more of the fragments has a head-locked (HL) fragment type. For each pixel, a first group of the fragments and a second group of the fragments are identified based on the depths and fragment types of the fragments. In some implementations, the pixel correspondences of fragments of the second group are updated based on identifying the groups of fragments and an updated view is generated based on the first group of the fragments and the second group of the fragments.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
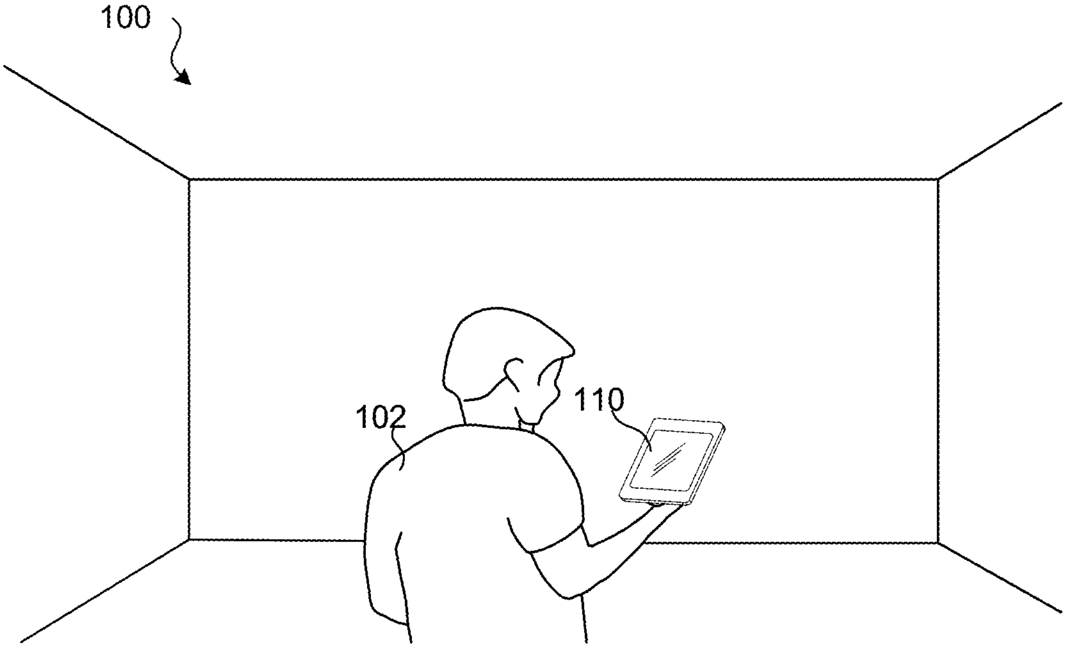
FIGS. 1A-B illustrate exemplary electronic devices operating in a physical environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
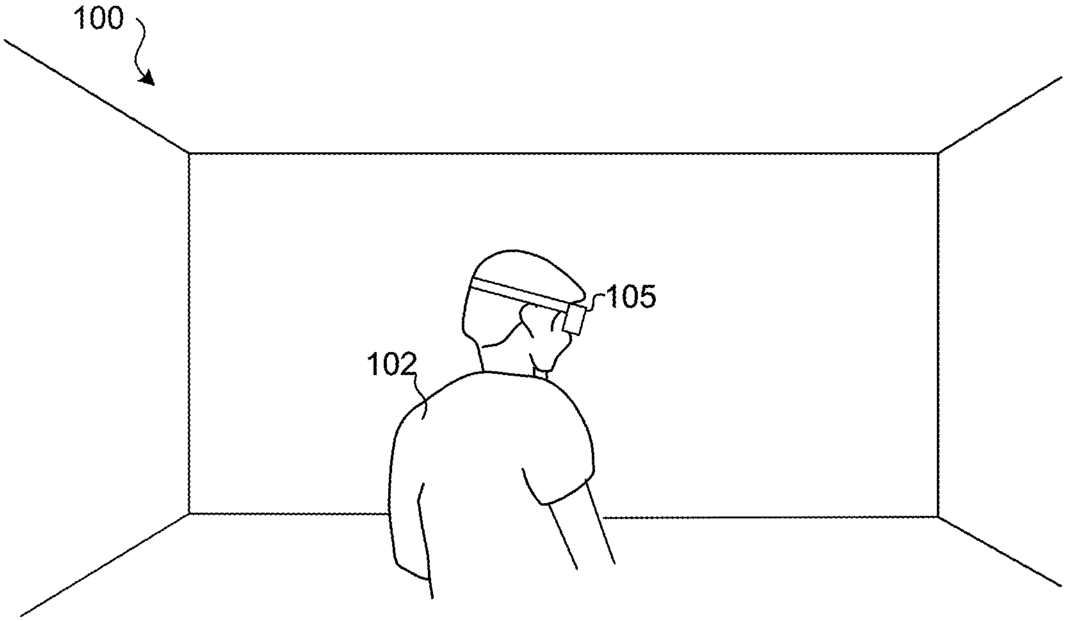

FIGS. 1A-B illustrate exemplary electronic devices 105 and 110 operating in a physical environment 100. The electronic devices 105 and 110 may include one or more cameras, microphones, depth sensors, light sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

In some implementations, video (e.g., pass-through video depicting a physical environment) is received from an image sensor of a device (e.g., device 105 or device 110). In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, motion sensor data, image data (e.g., retrieved via a virtual inertial odometry system (VIO), a simultaneous localization and mapping (SLAM) system, etc.).

In some implementations, a portion of content in an original view (e.g., a 2D grid of pixels) of an XR environment (comprising virtual content and/or real content) displayed on a device may be updated or reprojected to provide an updated view due to movement of a device or head of a user that may change WL content positions without changing HL content positions. In some implementations, WL layer content may be independently updated without updating HL content by utilizing a limited number of update layers such as, for example, two layers.

In some implementations, the WL layer content may be updated by identifying fragments associated with the original view. The fragments may associate appearance attributes such as, inter alia, color, transparency, etc. with corresponding pixels of the original view based on portions of content in the original view. The fragments may be associated with pixel correspondences that associate each fragment with a pixel of the original view. Likewise, the fragments may include depths that identify distances of portions of content from a viewpoint. For example, the depths may be based on 3D positions of the content depicted by the fragments from a position of the viewpoint within the XR environment. The fragments may include one or more fragments associated with a WL fragment type and one or more fragments associated with a HL fragment type.

In some implementations, a first group of fragments (e.g., only HL fragments) and a second group fragments (e.g., WL fragments and all other fragments located behind the WL fragments for a pixel) may be identified for each pixel based on depths and fragment types (e.g., WL or HL) of the fragments. The first group of the fragments may be identified (for each pixel) based on including all fragments that are closer to the viewpoint than a closest WL fragment. Likewise, the second group of fragments may be identified (for each pixel) based on including the closest WL fragment and all fragments that are further from the viewpoint than the closest WL fragment.

In response to identifying the first and second groups of fragments, pixel correspondences of fragments of the second group may be updated or reprojected and an updated view may be generated based on the first group and second group of fragments. The updated view may be generated by alpha blending the first group of the fragments with the second group of the fragments. Simultaneously or subsequently, disocclusion occurring between HL fragments and WL fragments may be detected and resolved utilizing at least one of the HL fragments.

Figure 2:
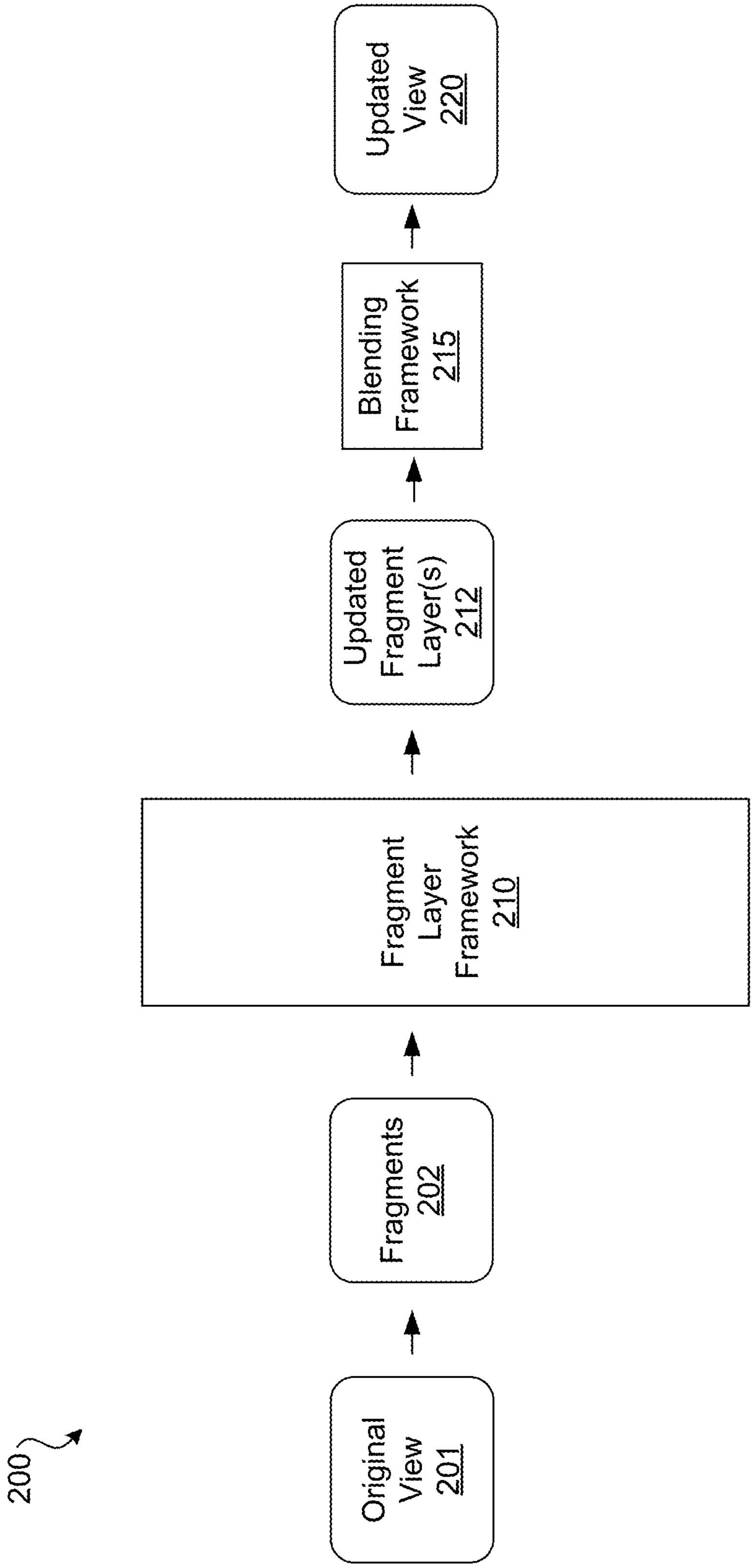
FIG. 2 illustrates a system enabled provide an updated content view of an XR environment in response to user or device movement, in accordance with some implementations.

FIG. 2 illustrates a system 200 enabled to provide an updated content view of an XR environment in response to user or device movement by updating pixel correspondences of fragments associated with an original content view, in accordance with some implementations. In some implementations, due to device movement, WL content may not be properly situated within a view and may appear to move. Therefore, system 200 is configured differentiate between HL content and WL content and only apply necessary transformations to the WL content to align with the HL content.

In some implementations, an original view 201 (comprising fragments 202) of an environment such as, inter alia, an XR environment is input into a fragment layer framework 210 in response to device movement that may cause a change to WL content positions but not to HL content positions thereby causing potential viewing errors or artifacts that may occur during a reprojection process. In response, fragments 202 (of original view 201) are identified as being an HL fragment type, a WL fragment type, etc. The identified fragments associate appearance attributes such as color, transparency, etc. with associated pixels of original view 201 based on portions of content of original view 201. Fragments 202 may include pixel correspondences that associate each of fragments 202 with a pixel of original view 201. Likewise, fragments 202 may include depths that identify distances of portions of the content from a viewpoint.

In some implementations, fragment layer framework 210 divides and places (the identified) fragments 202 into two differing layers (e.g., via an alpha blending process) in response to identifying a frontmost (e.g., closest to viewpoint) WL fragment. For example, all fragments that are located at positions in front of the frontmost fragment are placed into an HL layer that includes only HL fragments. All other fragments (of fragments 202) are placed into a WL layer that includes WL fragments and some HL fragments. Subsequently, fragment layer framework 210 updates pixel correspondences of fragments of the WL layer thereby shifting positions of the fragments (within the WL layer) from original pixel positions of original view 201 to new pixel positions within updated fragment layer(s) 212.

Updated fragment layer(s) 212 are input into a blending framework 215 for providing an updated view 220. Updated view 220 may be generated by reprojecting and feathering the WL layer and alpha blending the reprojected and feathered WL layer with the HL layer. For example, reprojection may include transforming fragments from a first perspective to a second perspective. Feathering the WL layer may include softening or smoothing edges or transitions between the fragments of pixels to reduce a perception of hard edges or sharp transitions thereby creating a seamless blend between the virtual content and the real world. Alpha blending the reprojected and feathered WL layer with the HL layer may include alpha blending the HL layer on top of the WL layer such that fragments 202 comprising varying levels of transparency or opacity may be combined. Alpha channels may be used to detect when disocclusion occurs and fragments of the HL layer be used to resolve the disocclusion. For example, an alpha channel may be configured to determine how transparent each fragment or pixel is thereby enabling the HL layer to be alpha blended on top of the WL layer taking into account a transparency of each pixel or fragment.

Figure 3:
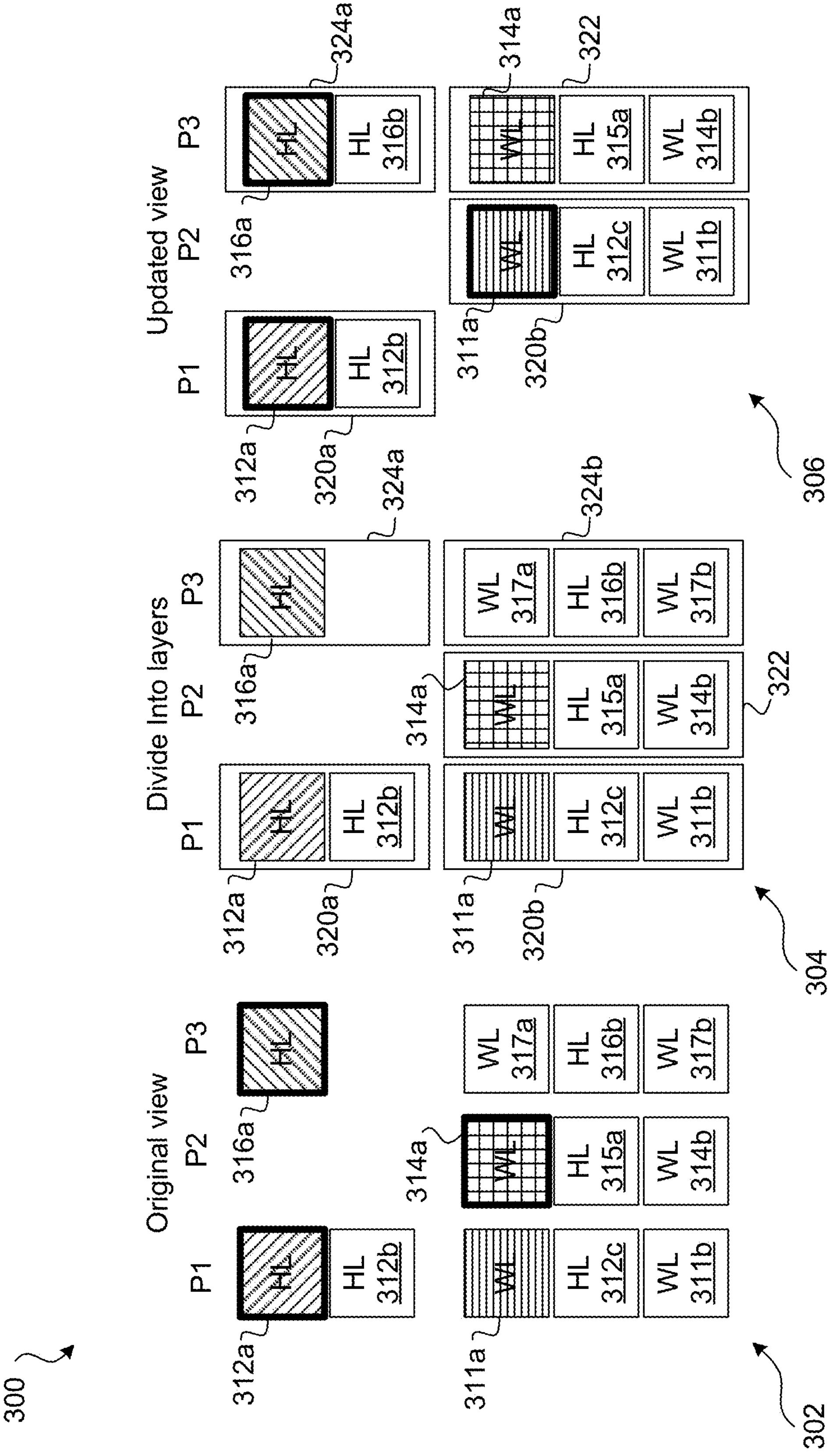
FIG. 3 illustrates a processing sequence for updating or reprojecting a portion of content within an original view of a scene displayed on a device, in accordance with some implementations.

FIG. 3 illustrates a processing sequence 300 for updating or reprojecting a portion of content within an original view 302 of a scene displayed on a device such as an HMD, in accordance with some implementations. Updating or reprojecting a portion of content within original view 302 results in an updated view 306 of the scene generated based on device movement that may result in movement of WL content positions without movement of HL content positions. Original view 302 illustrates pixel fragments (e.g., a 2D grid of pixel values) representing content prior to rendering. In some implementations, fragments (associated with pixels P1, P2, and P3) of original view 302 are divided into layers (as illustrated in view 304) in response to identifying a frontmost (i.e., closest to viewpoint) WL fragment. For example, for each of pixels P1, P2, and P3, all fragments located in front of the frontmost WL fragment are placed into a first layer comprising only HL fragments and all additional fragments are into a second layer comprising WL fragments and HL fragments.

During processing sequence 300, original view 302, view 304, and updated view 306 occur at successive points in time. For example, original view 302 represents pixel fragments at a first instant in time occurring prior to rendering, view 304 corresponds to a second instant in time after the first instant in time (during rendering), and updated view 306 corresponds to a third instant in time (during rendering) after the second instant in time.

Original view 302 illustrates an initial configuration of pixels P1, P2, and P3 at the first instant in time occurring prior to rendering. The initial configuration of pixel P1 comprises an initial arrangement of HL fragments 312*a* (i.e., a frontmost viewable fragment), 312*b*, and 312*c* and an initial arrangement of WL fragments 311*a* and 311*b*. The initial configuration of pixel P2 comprises an initial arrangement of an HL fragment 315*a* and an initial arrangement of WL fragments 314*a* (i.e., a frontmost viewable fragment) and 314*b*. The initial configuration of pixel P3 comprises an initial arrangement of HL fragments 316*a* (i.e., a frontmost viewable fragment) and 316*b* and an initial arrangement of WL fragments 317*a* and 317*b*.

View 304 illustrates each of pixels P1, P2, and P3 divided into HL layers and WL layers (during the second instant in time) based on identifying a frontmost (i.e., closest to viewpoint) WL fragment. For example, view 304 illustrates pixel P1 divided into HL layer 320*a* and WL layer 320*b*. HL layer 320*a* comprises HL fragments 312*a* and 312*b*. WL layer 320*b* comprises WL fragments 311*a* (i.e., a fragment of pixel P1 that is closest to viewpoint) and 311*b* and HL fragment 312*c*. View 304 further illustrates pixel P2 divided into WL layer 322 comprising WL fragments 314*a* (i.e., a fragment of pixel P2 that is closest to viewpoint) and 314*b* and HL fragment 315*a*. View 304 further illustrates pixel P3 divided into HL layer 324*a* and WL layer 324*b*. HL layer 324*a* comprises HL fragment 316*a*. WL layer 324*b* comprises WL fragments 317*a* (i.e., a fragment of pixel P3 that is closest to viewpoint) and 317*b* and HL fragment 316*b*.

Updated view 306 illustrates an updated (or reprojected) configuration of pixels P1, P2, and P3 at the third instant in time. The updated configuration illustrates a shift (e.g., to the right) of positions of some of the fragments from original pixel positions (of original view 302) to new or updated pixel positions in updated view 306. Subsequently each of the HL and WL layers of respective pixels P1, P2, and P3 are alpha blended to provide updated view 306.

The updated configuration of pixel P1 comprises an updated arrangement comprising only HL layer 320*a* (without WL layer 320*b*) including HL fragments 312*a* and 312*b*. The updated configuration of pixel P2 comprises reprojected WL layer 320*b* (i.e., shifted over from pixel P1) comprising WL fragments 311*a* (i.e., currently a frontmost viewable fragment) and 311*b* and HL fragment 312*c*. The updated configuration of pixel P3 comprises HL layer 324*a* comprising HL fragment 316*a* and an extra HL fragment copy 316*b* to be used for any possible disocclusion issues. The updated configuration of pixel P3 further comprises reprojected WL layer 322 (i.e., shifted from pixel P2) comprising WL fragments 314*a* and 314*b* and HL fragment 315*a*. For example, reprojected WL layer 322 includes WL fragments 314*a* and 314*b* and HL fragment 315*a* shifted from a first perspective to a second perspective. Subsequently, WL layer 322 may be feathered and alpha blended with HL layer 324*a*. Feathering WL layer 322 may include softening or smoothing edges or transitions between fragments to reduce a perception of hard edges or sharp transitions thereby creating a seamless blend between virtual content and real-world content.

Figure 4:
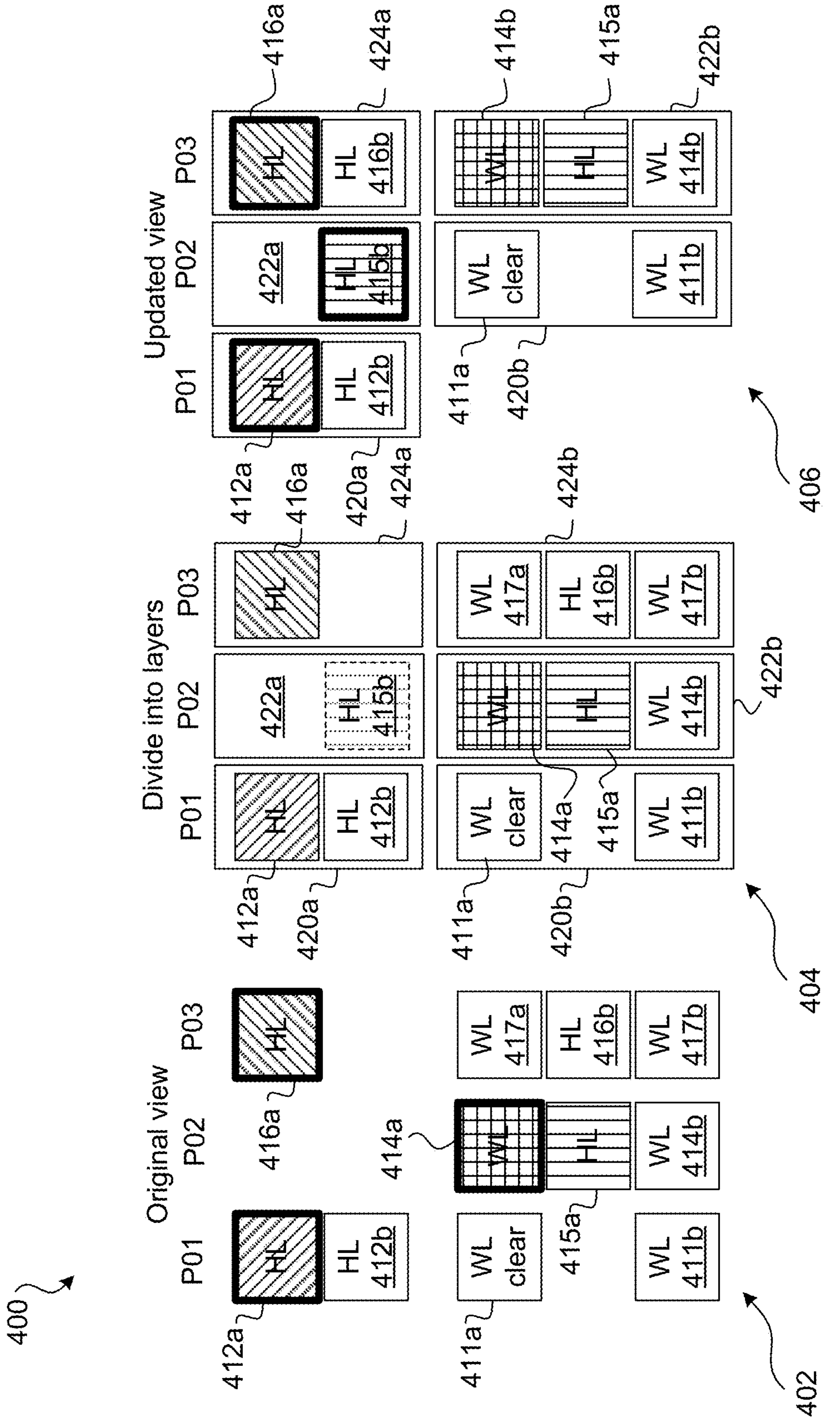
FIG. 4 illustrates a processing sequence for updating or reprojecting a portion of content that includes a clear fragment within an original view of a scene displayed on a device, in accordance with some implementations.

FIG. 4 illustrates a processing sequence 400 for updating or reprojecting a portion of content that includes a clear fragment 411*a* within an original view 402 of a scene displayed on a device such as an HMD, in accordance with some implementations. Updating or reprojecting a portion of content within original view 402 results in an updated view 406 of the scene generated to resolve disocclusion issues caused by a clear (e.g., transparent) fragment 411*a*. In some implementations, fragments (associated with pixels P01, P02, and P03) of original view 402 are divided into layers (as illustrated in view 404) in response to identifying a frontmost (i.e., closest to viewpoint) WL fragment. For example, for each of pixels P01, P02, and P03, all fragments located in front of the frontmost fragment are placed into a first layer comprising only HL fragments and all additional fragments are into a second layer comprising WL fragments and HL fragments.

During processing sequence 400, original view 402, view 404, and updated view 406 occur at successive points in time. For example, original view 402 corresponds to a first instant in time, view 404 and corresponds to a second instant in time after the first instant in time, and updated view 406 corresponds to a third instant in time after the second instant in time.

Original view 402 illustrates an initial configuration of pixels P01, P02, and P03 at the first instant in time. The initial configuration of pixel P01 comprises an initial arrangement of HL fragments 412*a* (i.e., a frontmost viewable fragment) and 412*b* and an initial arrangement of WL fragments 411*a* (i.e., a clear fragment) and 411*b*. The initial configuration of pixel P02 comprises an initial arrangement of an HL fragment 415*a* and an initial arrangement of WL fragments 414*a* (i.e., a frontmost viewable fragment) and 414*b*. The initial configuration of pixel P03 comprises an initial arrangement of HL fragments 416*a* (i.e., a frontmost viewable fragment) and 416*b* and an initial arrangement of WL fragments 417*a* and 417*b*.

View 404 illustrates each of pixels P01, P02, and P03 divided into HL layers and WL layers (during the second instant in time) based on identifying a frontmost (i.e., closest to viewpoint) WL fragment. For example, view 404 illustrates pixel P01 divided into HL layer 420*a* and WL layer 420*b*. HL layer 420*a* comprises HL fragments 412*a* and 412*b*. WL layer 420*b* comprises WL fragments 411*a* (i.e., a clear fragment of pixel P01 that is closest to viewpoint) and 411*b*. View 404 further illustrates pixel P02 divided into HL layer 422*a* and WL layer 422*b*. HL layer 422*a* comprises an HL fragment copy 415*b* (e.g., a copy of HL fragment 415*a*) comprising a flag specifying usage for resolving disocclusion issues caused by a clear (e.g., transparent) fragment such as fragment 411*a* being shifted (e.g., shifted over from pixel P01) as a frontmost viewable fragment. WL layer 422*b* comprises WL fragments 414*a* (i.e., a fragment of pixel P02 that is closest to viewpoint) and 414*b* and HL fragment 415*a*. View 404 further illustrates pixel P03 divided into HL layer 424*a* and WL layer 424*b*. HL layer 424*a* comprises HL fragment 416*a*. WL layer 424*b* comprises WL fragments 417*a* (i.e., a fragment of pixel P3 that is closest to viewpoint) and 417*b* and HL fragment 416*b*.

Updated view 406 illustrates an updated (or reprojected) configuration of pixels P01, P02, and P03 at the third instant in time. The updated configuration illustrates a shift (e.g., to the right) of positions of some of the fragments from original pixel positions (of original view 402) to new or updated pixel positions in updated view 406. Subsequently each of the HL and WL layers of respective pixels P01, P02, and P03 are alpha blended to provide updated view 406.

The updated configuration of pixel P01 comprises an updated arrangement comprising only HL layer 420*a* (without WL layer 420*b*) including HL fragments 412*a* and 412*b*. The updated configuration of pixel P02 comprises HL layer 422*a* including an HL fragment copy 415*b* (e.g., a copy of HL fragment 415*a*) for use in resolving disocclusion issues caused by clear (e.g., transparent or opaque) fragment 411*a* being shifted (e.g., shifted over from pixel P01) as a frontmost viewable fragment. The updated configuration of pixel P02 further comprises reprojected WL layer 420*b* (i.e., shifted over from pixel P1) comprising WL fragments 411*a* (i.e., currently a frontmost clear fragment) and 411*b*. Subsequently, WL layer 420*b* may be feathered and alpha blended with HL layer 422*a*. Alpha blending the reprojected and feathered WL layer 420*b* with the HL layer 422*a* includes alpha blending HL layer 422*a* on top of WL layer 420*b* such that clear fragment 411*a* is obscured by HL fragment 415*b* to resolve disocclusion caused by the clear fragment 411*a*. The updated configuration of pixel P03 comprises HL layer 424*a* comprising HL fragment 416*a* and an extra HL fragment copy 416*b* to be used for any additional possible disocclusion issues. The updated configuration of pixel P03 further comprises reprojected WL layer 422*b* (i.e., shifted from pixel P02) comprising WL fragments 414*a* and 414*b* and HL fragment 415*a*. For example, reprojected WL layer 422 includes WL fragments 414*a* and 414*b* and HL fragment 415*a* shifted from a first perspective to a second perspective. Subsequently, WL layer 422 is feathered and alpha blended with HL layer 424*a*.

Updated view 406 illustrates HL pixel 412*a* as a frontmost viewable fragment of pixel P01, HL pixel 415*b* as a frontmost viewable fragment of pixel P02, and HL pixel 416*a* as a frontmost viewable fragment of pixel P03.

Figure 5:
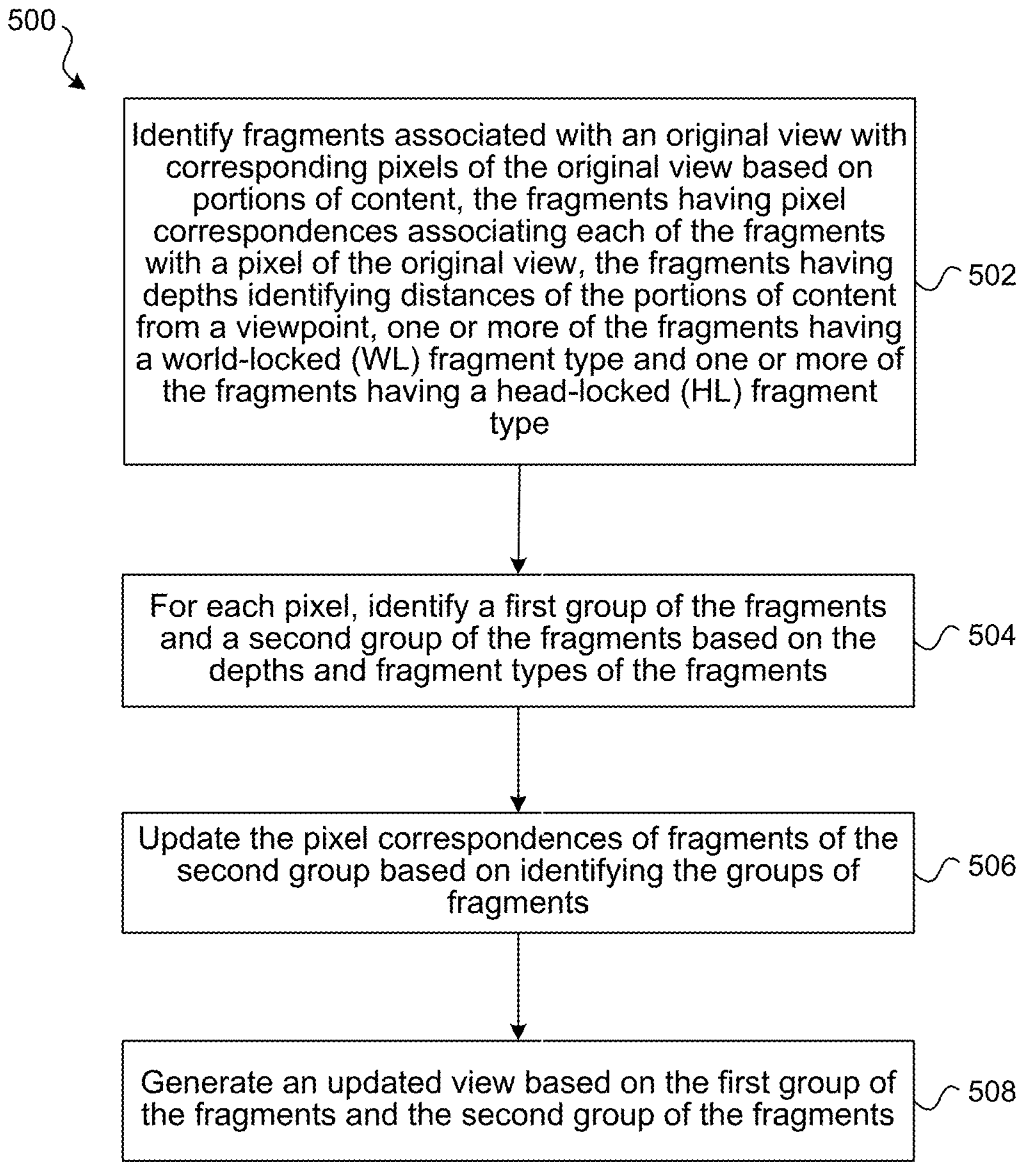
FIG. 5 is a flowchart representation of an exemplary method that provides an updated content view of an XR environment based on device movement, in accordance with some implementations.

FIG. 5 is a flowchart representation of an exemplary method 500 that provides an updated content view of an XR environment based on device movement, in accordance with some implementations. In some implementations, the method 500 is performed by a device, such as a mobile device, desktop, laptop, HMD, or server device. In some implementations, the device has a screen for displaying images and/or a screen for viewing stereoscopic images such as a head-mounted display (HMD such as e.g., device 105 or 110 of FIGS. 1A and 1B). In some implementations, the method 500 is performed by processing logic, including hardware, firmware, software, or a combination thereof. In some implementations, the method 500 is performed by a processor executing code stored in a non-transitory computer-readable medium (e.g., a memory). Each of the blocks in the method 500 may be enabled and executed in any order.

At block 502, the method 500 identifies fragments (corresponding to pixels) associated with an original view of an XR environment displayed on a device. The fragments (e.g., WL fragments, HL fragments, etc.) associate appearance attributes with corresponding pixels of the original view of the XR environment based on portions of content. The fragments include pixel correspondences associating each of the fragments with a pixel of the original view. For example, the identified fragments may associate appearance attributes such as, inter alia, color, transparency, etc. with associated pixels of an original view 201 based on portions of content of original view 201 as described with respect to FIG. 2. The fragments may include depths that identify distances of the portions of content from a viewpoint. For example, the depths may be determined based on 3D positions of the content depicted by the fragments from a position of the viewpoint within the XR environment as described with respect to FIG. 2.

At block 504, the method 500 identifies a first group (or layer) of fragments (e.g., only HL fragments) and a second group (or layer) of fragments (e.g., a first WL fragment and all additional fragments (may include WL fragments and at least one or more HL fragments) behind it for the pixel) based on depths and fragment types (e.g., WL, HL, etc.) of the fragments. For example, a pixel P1 divided into an HL layer 320*a* comprising HL fragments 312*a* and 312*b* and a WL layer 320*b* comprising WL fragments 311*a* and 311*b* and an HL fragment 312*c* as described with respect to FIG. 3.

In some implementations, for each pixel or at a logical, object, or window level, the first group of the fragments may be identified based on including all fragments that are closer to a viewpoint than a closest WL fragment of the fragments.

In some implementations, for each pixel or at a logical, object, or window level, the second group of fragments may be identified based on including a closest WL fragment and all that are further from the viewpoint than the closest WL fragment.

At block 506, the method 500 updates pixel correspondences of fragments of the second group based on identifying the groups of fragments. For example, an updated configuration may include a shift of positions of some of the fragments from original pixel positions to new or updated pixel positions as described with respect to FIG. 3.

At block 508, the method 500 generates an updated view based on the first group of the fragments and the second group of the fragments. For example, updated view 306 as described with respect to FIG. 3.

In some implementations, disocclusion occurring between HL fragments and WL fragments may be detected and resolved utilizing additional HL fragments such as HL fragment 415*a* as described with respect to FIG. 4.

In some implementations, generating the updated view is further based on movement of the device (presenting the XR environment) that changes positions of WL content without changing positions of HL content as described with respect to FIG. 3.

In some implementations, generating the updated view may include alpha blending the first group of the fragments with the second group of the fragments. For example, alpha blending HL layer 422*a* on top of WL layer 420*b* as described with respect to FIG. 4.

Figure 6:
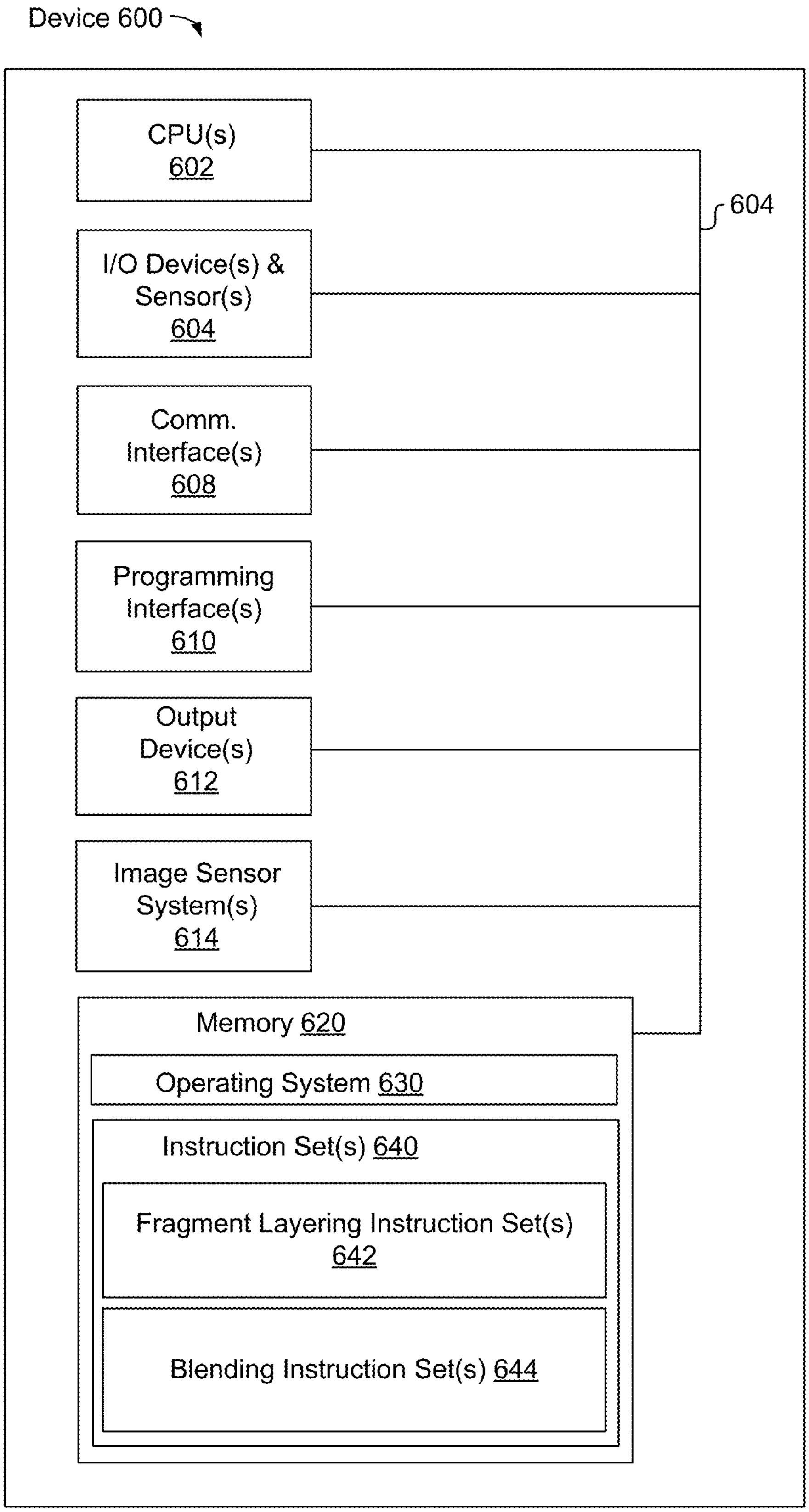
FIG. 6 is a block diagram of an electronic device of in accordance with some implementations.

FIG. 6 is a block diagram of an example device 600. Device 600 illustrates an exemplary device configuration for electronic devices 105 and 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUS, CPUs, processing cores, and/or the like), one or more input/output (I/O) devices and sensors 604, one or more communication interfaces 608 (e.g., USB, FIREWIRE, THUNDERBOLT, IEEE 802.3x, IEEE 802.11x, IEEE 802.14x, GSM, CDMA, TDMA, GPS, IR, BLUETOOTH, ZIGBEE, SPI, I2C, and/or the like type interface), one or more programming (e.g., I/O) interfaces 610, output devices (e.g., one or more displays) 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), one or more cameras (e.g., inward facing cameras and outward facing cameras of an HMD), one or more infrared sensors, one or more heat map sensors, and/or the like.

In some implementations, the one or more displays 612 are configured to present a view of a physical environment, a graphical environment, an extended reality environment, etc. to the user. In some implementations, the one or more displays 612 are configured to present content (determined based on a determined user/object location of the user within the physical environment) to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 100. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, sensor data may be obtained by device(s) (e.g., devices 105 and 110 of FIG. 1) during a scan of a room of a physical environment. The sensor data may include a 3D point cloud and a sequence of 2D images corresponding to captured views of the room during the scan of the room. In some implementations, the sensor data includes image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, IMU, etc.). In some implementations, the sensor data includes visual inertial odometry (VIO) data determined based on image data. The 3D point cloud may provide semantic information about one or more elements of the room. The 3D point cloud may provide information about the positions and appearance of surface portions within the physical environment. In some implementations, the 3D point cloud is obtained over time, e.g., during a scan of the room, and the 3D point cloud may be updated, and updated versions of the 3D point cloud obtained over time. For example, a 3D representation may be obtained (and analyzed/processed) as it is updated/adjusted over time (e.g., as the user scans a room).

In some implementations, sensor data may be positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In some implementations, the device 600 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 600 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 600.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 includes a fragment layering instruction set 642 and a blending instruction set 644. The instruction set(s) 640 may be embodied as a single software executable or multiple software executables.

The fragment layering instruction set 642 is configured with instructions executable by a processor to identify a first group of fragments (e.g., only HL) for a first layer and a second group of the fragments (e.g., first WL and all fragments behind it for the pixel) for a second layer (for reprojection) based on the depths and fragment types of the fragments.

The blending instruction set 644 is configured with instructions executable by a processor to alpha blending a reprojected WL layer with an HL layer to generate an updated view of an XR environment.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device having a processor:

identifying fragments associated with an original view displayed on the device, the fragments associating appearance attributes with corresponding pixels of the original view based on portions of content, the fragments having pixel correspondences associating each of the fragments with a pixel of the original view, the fragments having depths identifying distances of the portions of content from a viewpoint, one or more of the fragments having a world-locked (WL) fragment type and one or more of the fragments having a head-locked (HL) fragment type;

for each pixel, identifying a first group of the fragments and a second group of the fragments based on the depths and fragment types of the fragments;

updating the pixel correspondences of fragments of the second group based on identifying the groups of fragments; and generating an updated view based on the first group of the fragments and the second group of the fragments.

2. The method of claim 1, wherein, for each pixel, the first group of the fragments is identified based on including all fragments, of the fragments, that are closer to the viewpoint than a closest WL fragment of the fragments.

3. The method of claim 2, wherein, for each pixel, the second group of fragments is identified based on including:

the closest WL fragment; and all fragments, of the fragments, that are further from the viewpoint than the closest WL fragment.

4. The method of claim 1, further comprising:

detecting disocclusion occurring between HL fragments and WL fragments of the fragments; and resolving the disocclusion utilizing at least one of the HL fragments.

5. The method of claim 1, wherein said generating the updated view is further based on movement of the device.

6. The method of claim 1, wherein said generating the updated view comprises alpha blending the first group of the fragments with the second group of the fragments.

7. The method of claim 1, wherein the appearance attributes comprise color attributes or transparency attributes.

8. The method of claim 1, wherein the original view and the updated view each comprise views of an extended reality (XR) environment that include virtual content and real content.

9. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the electronic device to perform operations comprising:

identifying fragments associated with an original view with corresponding pixels of the original view based on portions of content, the fragments having pixel correspondences associating each of the fragments with a pixel of the original view, the fragments having depths identifying distances of the portions of content from a viewpoint, one or more of the fragments having a world-locked (WL) fragment type and one or more of the fragments having a head-locked (HL) fragment type;

for each pixel, identifying a first group of the fragments and a second group of the fragments based on the depths and fragment types of the fragments;

updating the pixel correspondences of fragments of the second group based on identifying the groups of fragments; and generating an updated view based on the first group of the fragments and the second group of the fragments.

10. The device of claim 9, wherein, for each pixel, the first group of the fragments is identified based on including all fragments, of the fragments, that are closer to the viewpoint than a closest WL fragment of the fragments.

11. The device of claim 10, wherein, for each pixel, the second group of fragments is identified based on including:

the closest WL fragment; and all fragments, of the fragments, that are further from the viewpoint than the closest WL fragment.

12. The device of claim 9, wherein the program instructions, when executed on the one or more processors, further cause the device to perform operations comprising:

detecting disocclusion occurring between HL fragments and WL fragments of the fragments; and resolving the disocclusion utilizing at least one of the HL fragments.

13. The device of claim 9, wherein said generating the updated view is further based on movement of the device.

14. The device of claim 9, wherein said generating the updated view comprises alpha blending the first group of the fragments with the second group of the fragments.

15. The device of claim 9, wherein the appearance attributes comprise color attributes or transparency attributes.

16. The device of claim 9, wherein the original view and the updated view each comprise views of an extended reality (XR) environment that include virtual content and real content.

17. A non-transitory computer-readable storage medium storing program instructions executable via one or more processors of a device to perform operations comprising:

identifying fragments associated with an original view with corresponding pixels of the original view based on portions of content, the fragments having pixel correspondences associating each of the fragments with a pixel of the original view, the fragments having depths identifying distances of the portions of content from a viewpoint, one or more of the fragments having a world-locked (WL) fragment type and one or more of the fragments having a head-locked (HL) fragment type;

for each pixel, identifying a first group of the fragments and a second group of the fragments based on the depths and fragment types of the fragments;

updating the pixel correspondences of fragments of the second group based on identifying the groups of fragments; and generating an updated view based on the first group of the fragments and the second group of the fragments.

18. The non-transitory computer-readable storage medium of claim 17, wherein, for each pixel, the first group of the fragments is identified based on including all fragments, of the fragments, that are closer to the viewpoint than a closest WL fragment of the fragments.

19. The non-transitory computer-readable storage medium of claim 18, wherein, for each pixel, the second group of fragments is identified based on including:

the closest WL fragment; and all fragments, of the fragments, that are further from the viewpoint than the closest WL fragment.

20. The non-transitory computer-readable storage medium of claim 17, wherein the program instructions, when executed via the one or more processors, further perform operations comprising: detecting disocclusion occurring between HL fragments and WL fragments of the fragments; and resolving the disocclusion utilizing at least one of the HL fragments.

* * * * *